US009680596B2

(12) United States Patent
Bouda et al.

(10) Patent No.: US 9,680,596 B2
(45) Date of Patent: Jun. 13, 2017

(54) SPAN-WISE SPECTRUM MANAGEMENT SYSTEM AND METHOD

(71) Applicant: Fujitsu Limited, Kawasaki-shi, Kanagawa (JP)

(72) Inventors: Martin Bouda, Plano, TX (US); Paparao Palacharla, Richardson, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/854,853

(22) Filed: Sep. 15, 2015

(65) Prior Publication Data

US 2016/0105252 A1   Apr. 14, 2016

Related U.S. Application Data

(60) Provisional application No. 62/063,204, filed on Oct. 13, 2014.

(51) Int. Cl.
*H04J 14/02* (2006.01)

(52) U.S. Cl.
CPC ...... *H04J 14/0224* (2013.01); *H04J 14/0257* (2013.01)

(58) Field of Classification Search
USPC .......................................................... 398/49
See application file for complete search history.

(56) References Cited

U.S. PATENT DOCUMENTS

| 7,254,337 | B1* | 8/2007 | Islam | H04J 14/0206 |
| | | | | 398/83 |
| 2004/0028319 | A1* | 2/2004 | Ajgaonkar | G02B 6/29376 |
| | | | | 385/16 |
| 2011/0123197 | A1* | 5/2011 | Taylor | H04J 14/02 |
| | | | | 398/79 |
| 2014/0072303 | A1* | 3/2014 | Pfau | H04J 14/06 |
| | | | | 398/65 |

OTHER PUBLICATIONS

X. Zhuo et al., "400G WDM Transmission on the 50 GHz Grid for Future Optical Networks," Journal of Lightwave Technology, vol. 30, No. 24; 14 pages, Dec. 15, 2012.

(Continued)

*Primary Examiner* — David Payne
*Assistant Examiner* — Omar S Ismail
(74) *Attorney, Agent, or Firm* — Baker Botts L.L.P.

(57) ABSTRACT

Methods and systems are provided for optical signal transmission using span-wise spectrum management. The method includes transmitting a first optical signal at a first wavelength by a control system. The first optical signal has a first optical path distance. The method further includes determining a first guard band requirement for the first optical signal, and transmitting a second optical signal by the control system. The second optical signal has a second optical path distance. The method includes determining a second guard band requirement for the second optical signal, and placing the second optical signal spectrally adjacent to the first optical signal by selecting a second wavelength. The second wavelength is selected to satisfy the first and second guard band requirements.

17 Claims, 11 Drawing Sheets

(56) References Cited

OTHER PUBLICATIONS

H. Zang et al., "A Review of Routing and Wavelength Assignment Approaches for Wavelength-Routed Optical WDM Networks," Optical Networks Magazine; 14 pages, Jan. 2000.
D. Ives et al., "Adapting Transmitter Power and Modulation Format to Improve Optical Network Performance Utilizing the Gaussian Noise Model of Nonlinear Impairments," Journal of Lightwave Technology, vol. 32, No. 21; 10 pages, Nov. 1, 2014.
N. Sambo et al., "Toward High-Rate and Flexible Optical Networks," IEEE Communications Magazine; 7 pages, May 2012.
X. Wang et al., "Blocking Performance in Dynamic Flexible Grid Optical Networks—What is the Ideal Spectrum Granularity?", ECOC Technical Digest, paper Mo.2.K.6; 3 pages, 2011.
Y. Sone et al., "Routing and Spectrum Assignment Algorithm Maximizes Spectrum Utilization in Optical Networks," ECOC Technical Digest, paper Mo.1.K.3; 3 pages, 2011.
O. Bertran-Pardo et al., "Transmission of 50-GHz-Spaced Single-Carrier Channels at 516Gb/s over 600km," OFC/NFOEC Technical Digest, paper OTh4E.2; 3 pages, 2013.

\* cited by examiner

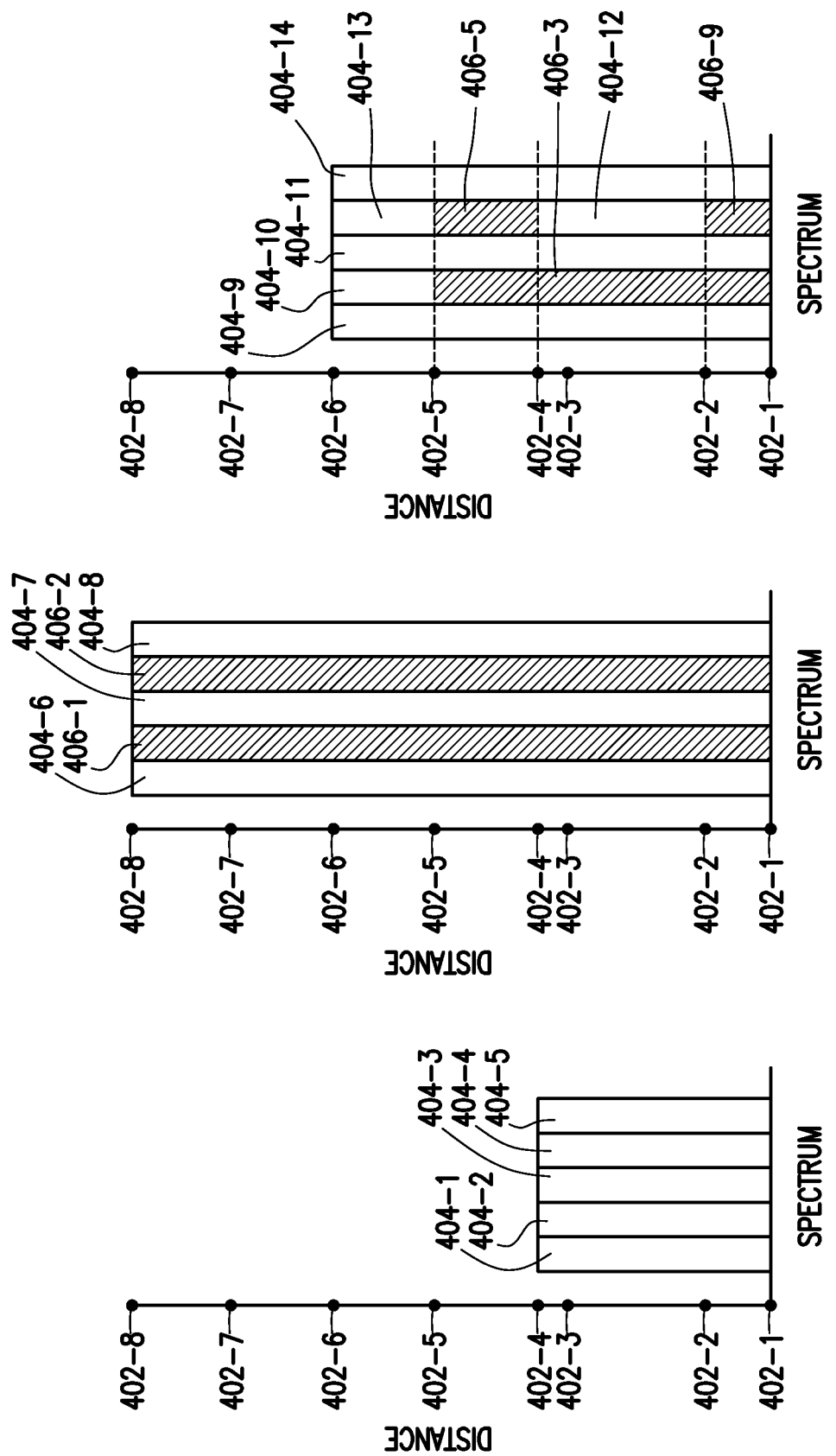

SPAN-WISE SPECTRUM MANAGEMENT SYSTEM AND METHOD

CROSS-REFERENCE TO RELATED APPLICATIONS

The present application claims the benefit of priority under 35 U.S.C. §119 from U.S. Provisional Patent Application Ser. No. 62/063,204, filed on Oct. 13, 2014, which is incorporated by reference in its entirety for all purposes.

TECHNICAL FIELD

The present disclosure relates generally to optical communication networks and, more particularly, to a span-wise spectrum management system and method.

BACKGROUND

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, etc. configured to perform various operations within the network.

Efforts to increase efficiency of traffic in optical networks have included improvements in Routing and Wavelength Assignment (RWA) and Software Defined Networking and technologies such as higher-order modulation, Nyquist-shaping, and multi-subcarrier super-channels. However, typical fragmentation of the optical spectrum in a mesh network can result in over 50% of the total fiber spectrum being unused when a first traffic demand cannot be satisfied. This can be due to blocking somewhere in the network. Also, optical paths shorter than the maximum reach can incur less optical impairment than they are capable of managing.

SUMMARY

In particular embodiments, a method includes transmitting a first optical signal at a first wavelength by a control system. The first optical signal has a first optical path distance. The method further includes determining a first guard band requirement for the first optical signal, and transmitting a second optical signal by the control system. The second optical signal has a second optical path distance. The method includes determining a second guard band requirement for the second optical signal, and placing the second optical signal spectrally adjacent to the first optical signal by selecting a second wavelength. The second wavelength is selected to satisfy the first and second guard band requirements.

In another embodiment, a network element includes a processor configured to receive a first optical signal at a first wavelength. The first optical signal has a first optical path distance. The processor is further configured to determine a first guard band requirement for the first optical signal, and receive a second optical signal having a second optical path distance. The processor is also configured to determine a second guard band requirement for the second optical signal, and place the second optical signal spectrally adjacent to the first optical signal by selecting a second wavelength. The second wavelength is selected to satisfy the first and second guard band requirements.

BRIEF DESCRIPTION OF THE DRAWINGS

For a more complete understanding of the present invention and its features and advantages, reference is now made to the following description, taken in conjunction with the accompanying drawings, in which:

FIGS. 4A-4C are examples of the optical reach of signals and guard bands across a spectrum;

DETAILED DESCRIPTION

Figure 1:
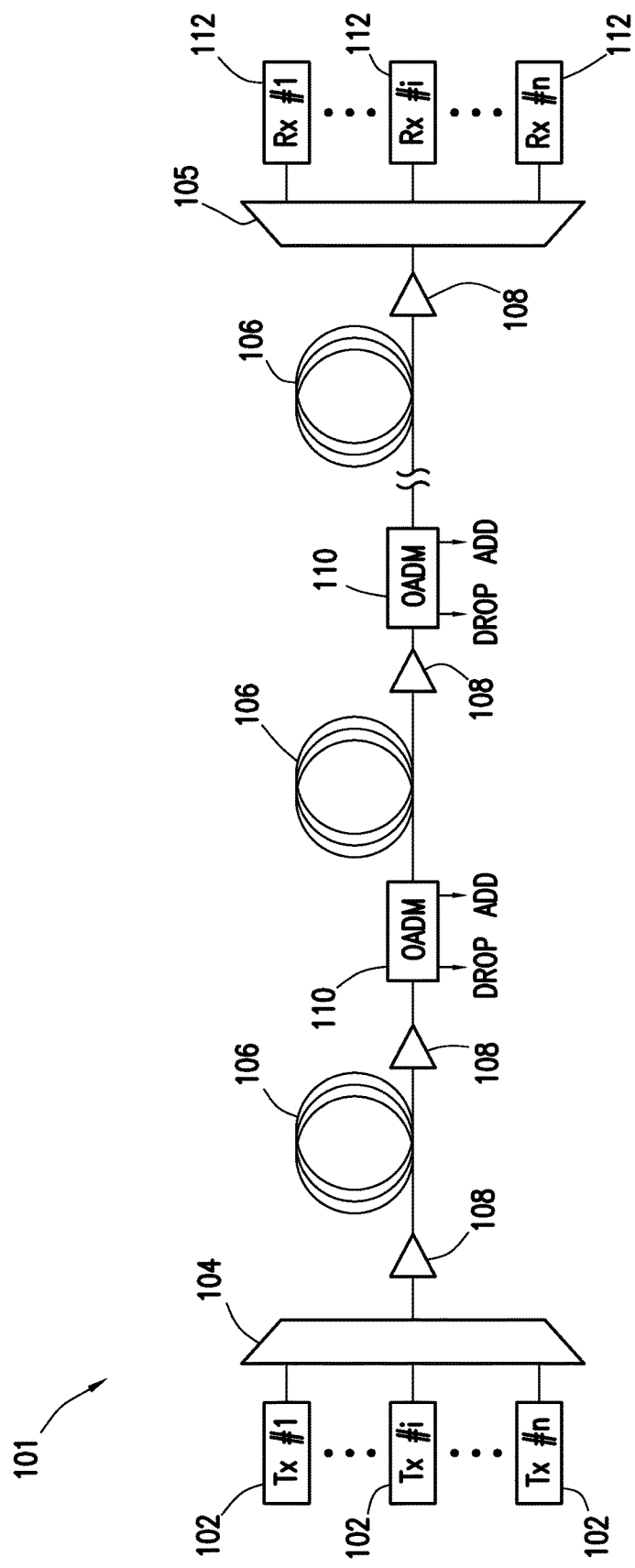
FIG. 1 is a block diagram of selected elements of an embodiment of an optical network.

The number of optical regenerators and transponders needed to satisfy a customer's traffic demand is an important concerns to network operators. Number of optical regenerators may be minimized by designing optical signals for maximum optical reach by mitigating the impact of optical impairments degrading the signal quality along the optical path. One such impairment is due to cross-phase modulation between adjacent optical signals. This effect may be mitigated by introducing optical spectrum that may not contain any signal power between neighboring optical signals. Cross-phase modulation includes phase noise on phase modulated signals in nearby channels. For example, each channel may be assigned particular wavelengths during transmission, and some channels may be left empty between wavelength assignments, creating a guard band. As such, the reduction in regeneration is at the expense of an increase in the rate that the optical spectrum in the network is consumed through the use of guard bands. Thus, although guard bands may not be able to be eliminated, minimizing the need for guard bands may reduce the consumption of the optical spectrum in the network and reduce the incidence of blocking Generally reducing the number of optical regenerators may be more important than other network utilization metrics.

Another metric of network utilization considered by network operators is the number of demands, or the total amount of traffic, that can sequentially be provisioned in a network without running into blocking due to a resource availability limitation. Network operators attempt to minimize blocking in order to not turn customers away. One approach to minimize blocking is to receive the signal at one wavelength and re-transmit it at another wavelength using, among other items, optical regenerators, in order to change the wavelength of the signal to fall into an available spectral range. Blocking may not be declared until alternate routes involving an additional optical regenerator have failed. However, regeneration may be costly and it may be necessary to minimize the number of regenerators.

Another approach to minimize blocking is to utilize less optical spectrum for each signal. As optical guard bands may be utilized to enhance optical reach and eliminate penalty due to cross-phase modulation, the objective may be to minimize the amount of optical guard band spectrum.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget 12-1 refers to an instance of a widget class, which may be referred to collectively as widgets 12 and any one of which may be referred to generically as a widget 12.

FIG. 1 is a block diagram of selected elements of an embodiment of optical network 101. As shown, optical network 101 may depict a transport plane view including elements that carry user data and comprise network equipment. Accordingly, optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 may comprise thin strands of glass capable of communicating the signals over long distances with very low loss. Optical fibers 106 may comprise any suitable type of fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within optical network 101. Amplifiers 108 may be positioned before or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). In some embodiments, other suitable amplifiers, such as a semiconductor optical amplifier (SOA), may be used.

OADMs 110 may be coupled to optical network 101 via fibers 106 also. OADMs 110 comprise an add/drop module, which may include any system, apparatus or device configured to add or drop optical signals from fibers 106. After passing through an OADM 110, a signal may travel along fibers 106 directly to a destination, or the signal may be passed through one or more additional OADMs 110 before reaching a destination. In some embodiments of optical network 101, OADM 110 may represent a reconfigurable OADM (ROADM) that is capable of adding or dropping individual or multiple wavelengths of a WDM signal carrying data channels to be added or dropped in the optical domain, for example, using a wavelength selective switch (WSS).

Optical network 101 may also include one or more demultiplexers 105 at one or more destinations of optical network 101. Demultiplexer 105 may comprise any system apparatus or device that may act as a demultiplexer by splitting a single WDM signal into its individual channels. For example, optical network 101 may transmit and carry a forty channel DWDM signal. Demultiplexer 105 may divide the single, forty channel DWDM signal into forty separate signals according to the forty different channels.

Optical network 101 may also include receivers 112 coupled to demultiplexer 105. Each receiver 112 may be configured to receive signals transmitted in a particular wavelength or channel, and process the signals for the information that they contain. Accordingly, optical network 101 may include at least one receiver 112 for every channel of the network.

Optical networks, such as optical network 101, may further employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). In PSK, the information carried by the optical signal may be conveyed by modulating the phase of a reference signal, also known as a carrier wave, or simple, a carrier. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

In an optical communications network, such as optical network 101, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (for example, network elements). As an example, the management plane may consist of a central processing center (for example, the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical network 101 without departing from the scope of the disclosure. For example, optical network 101 may include more or fewer elements than those depicted. Additionally optical network 101 may include additional elements not expressly shown, such as a dispersion compensation module. Also, as mentioned above, although depicted as a point-to-point network, optical network 101 may comprise any suitable network for transmitting optical signals such as a ring or mesh network.

Figure 2:
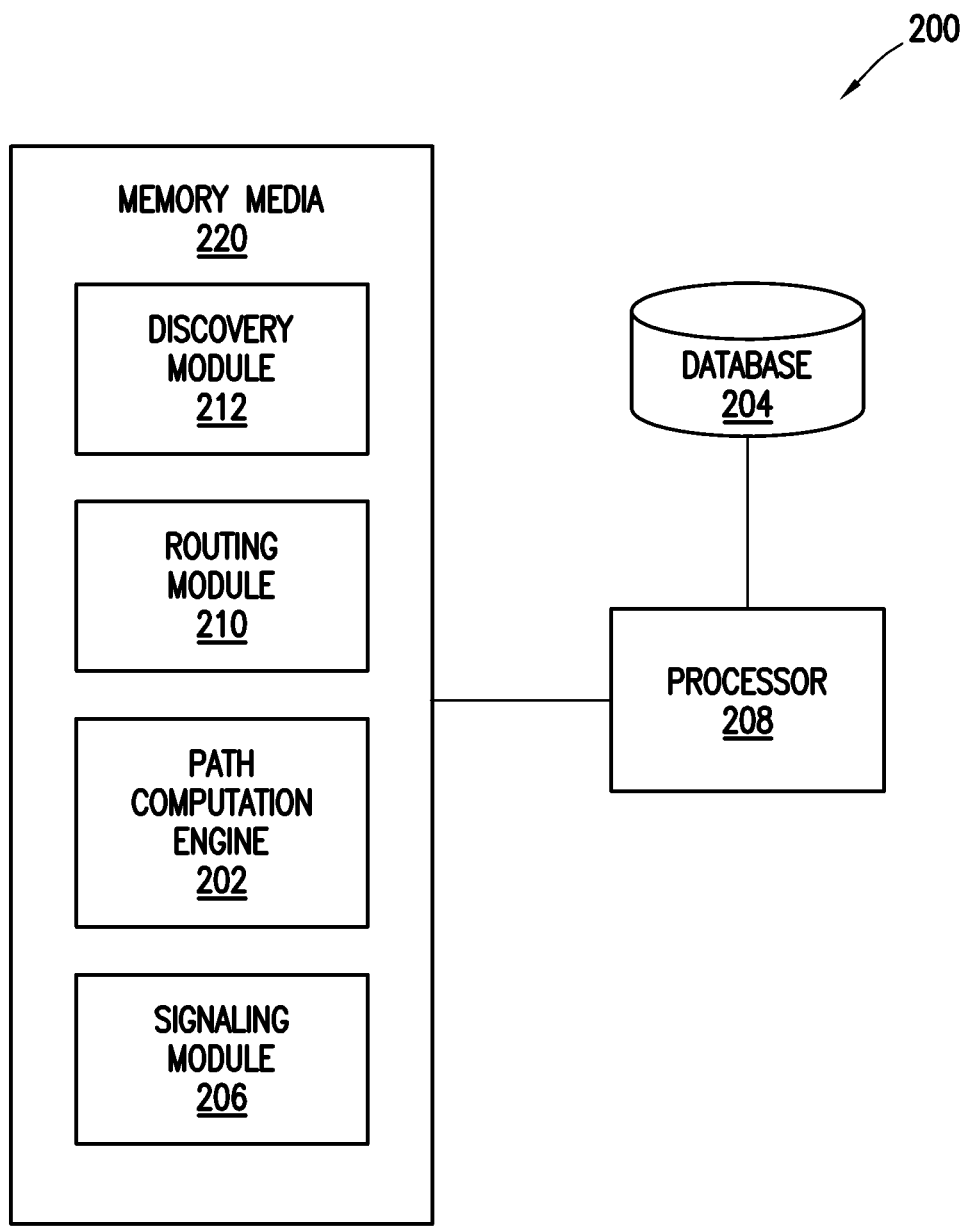
FIG. 2 is a block diagram of selected elements of an embodiment of a control system for allocating the optical spectrum in optical networks.

FIG. 2 is a block diagram of selected elements of an embodiment of control system 200 for allocating the optical spectrum in optical networks. A control plane may include functionality for network intelligence and control and may comprise applications that support the ability to establish network services. Network services include applications or modules for discovery, routing, path computation, and signaling. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220. Memory media 220 stores executable instructions (for example, executable code) that are executable by processor 208, which has access to memory media 220. Processor 208 may execute instructions that cause control system 200 to perform the functions and operations described herein. For the purposes of this disclosure, memory media 220 may include non-transitory computer-readable media that stores data or instructions for at least a period of time. Memory media 220 may comprise persistent and volatile media, fixed and removable media, and magnetic and semiconductor media. Memory media 220 may include, without limitation, storage media such as a direct access storage device (for example, a hard disk drive or floppy disk), a sequential access storage device (for example, a tape disk drive), compact disk (CD), random access memory (RAM), read-only memory (ROM), CD-ROM, digital versatile disc (DVD), electrically erasable programmable read-only memory (EEPROM), flash memory, non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. As described herein, path computation engine 202, in conjunction with signaling module 206, discovery module 212, and routing module 210, may represent instructions or code for implementing various algorithms according to the present disclosure.

In some embodiments, control system 200 may be configured to interface with a person (for example, a user) and receive data about the optical signal transmission path. For example, control system 200 may also include or may be coupled to one or more input devices or output devices to facilitate receiving data about the optical signal transmission path from the user or outputting results to the user. The one or more input or output devices (not shown) may include, but are not limited to, a keyboard, a mouse, a touchpad, a microphone, a display, a touchscreen display, an audio speaker, or the like. Additionally, control system 200 may be configured to receive data about the optical signal transmission path from a device such as another computing device or a network element (not shown in FIG. 2).

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to, fiber type; fiber length; number or type of components; data rate; modulation format of the data; input power of the optical signal; number of signal carrying wavelengths (for example, channels); channel spacing; traffic demand; or network topology, among others.

Routing module 210 may be responsible for propagating link connectivity information to various nodes within an optical network, such as optical network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Signaling module 206 may provide functionality associated with setting up, modifying, and tearing down end-to-end networks services in an optical network, such as optical network 101. For example, when an ingress node in the optical network receives a service request, control system 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In some embodiments, signaling module 206 may employ a signaling protocol to propagate subsequent communication to and from nodes along the network path.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) or others may affect optical signals within the optical signal transmission path. To determine the transmission characteristics of the optical signal transmission path, path computation engine 202 may consider the interplay between the transmission degradation factors. In some embodiments, path computation engine 202 may generate values for specific transmission degradation factors. Path computation engine 202 may further store data describing the optical signal transmission path in database 204. Path computation engine 202 may additionally be configured to tailor optical guard bands to each specific optical path to allocate the appropriate amount of guard band spectrum and use the remaining spectrum for satisfying additional traffic demands.

Figure 3A:
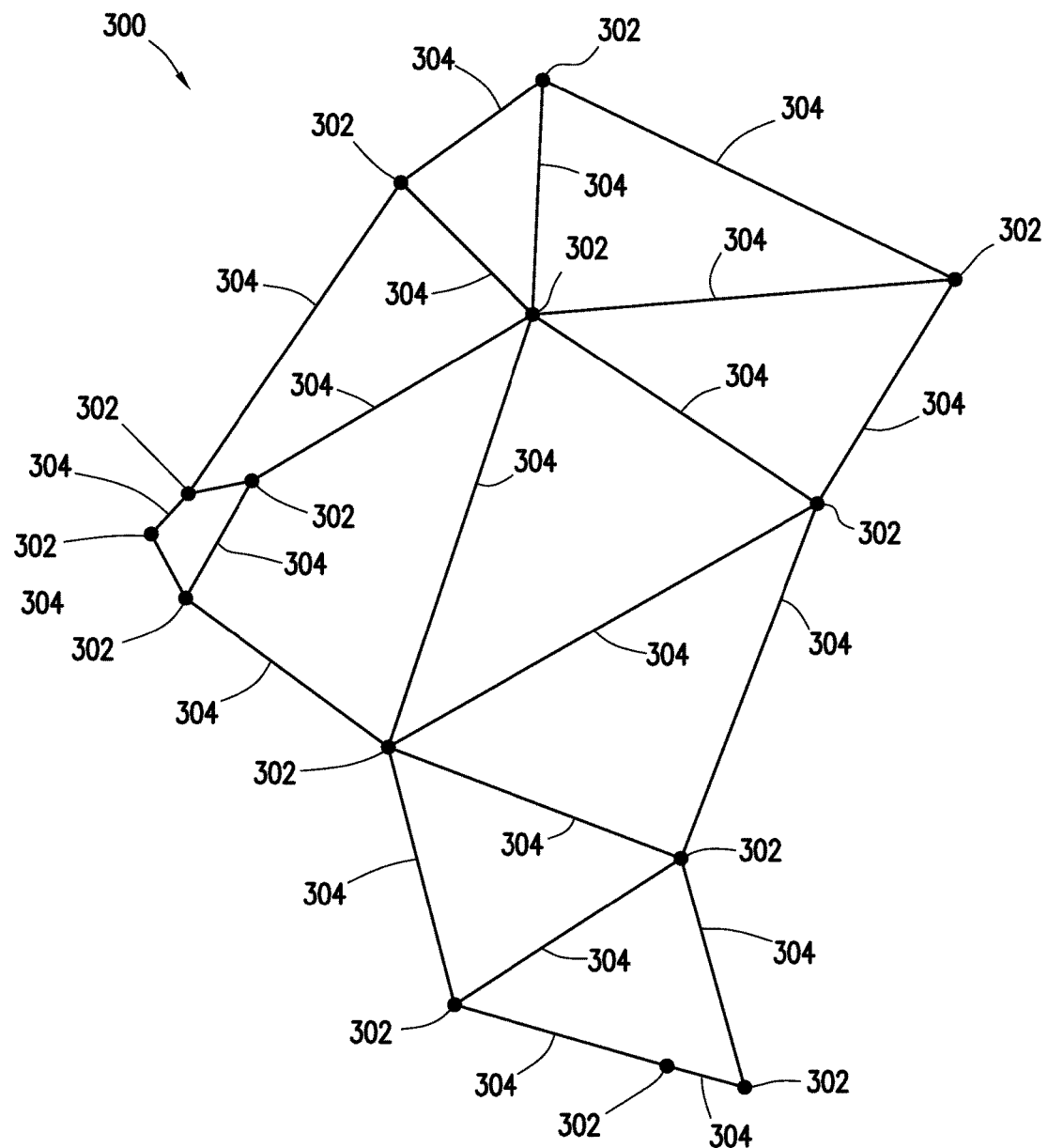
FIG. 3A is an example mesh network that utilizes guard bands.

FIG. 3A is an example mesh network 300 that utilizes guard bands. Mesh network 300 includes multiple nodes 302 that are separated by varied spans 304. The minimum span 304 may be approximately 31 kilometers (km), the average span 304 may be approximately 154 km, and the maximum span 304 may be approximately 295 km. Thus, nodes 302 in mesh network 300 may be at various locations at various distances from each other.

Figure 3B:
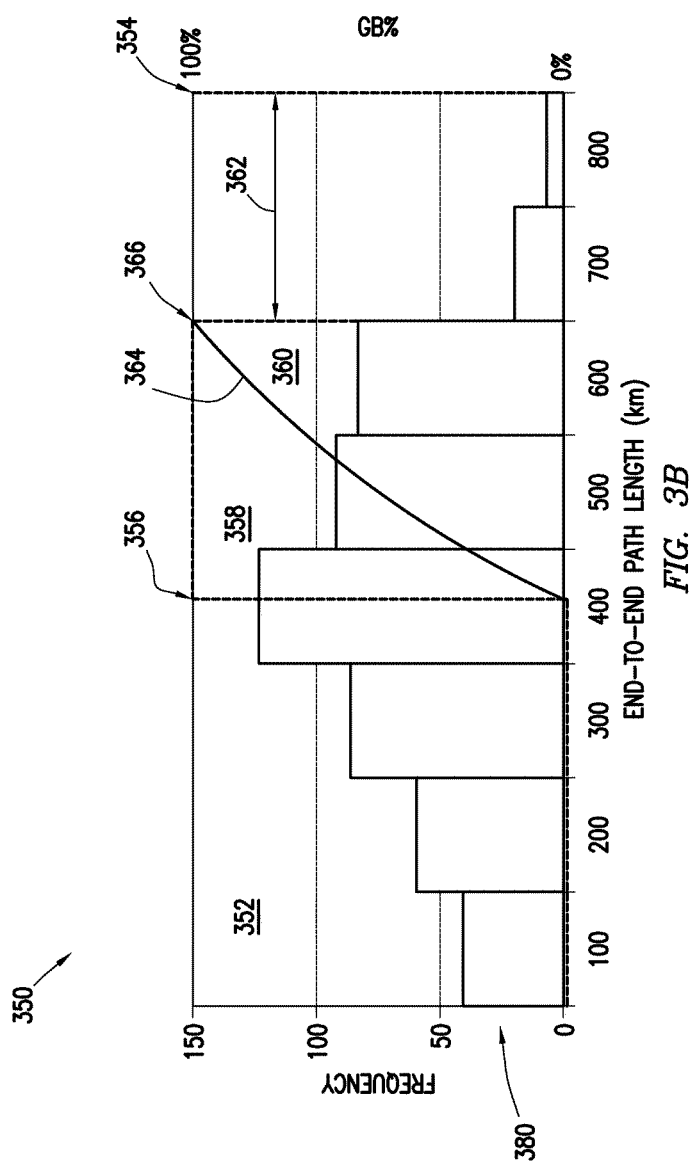
FIG. 3B is a histogram of end-to-end path lengths in the mesh network.

FIG. 3B is a diagram 350 that includes histogram 380 of end-to-end path lengths in mesh network 300. Up to a certain optical path distance or optical reach, the accumulation of cross-phase modulation and other sources of noise remain low enough for error-free transmission. For example, up to approximately 375 km there may be no need for a guard band because the accumulation of cross-phase modulation may not reach a threshold. Thus, up to this optical reach there may be no need for a guard band at all and corresponding paths with these path lengths are indicated by the histogram in this range may be referred to as no guard band (NO-GB) paths 352, limited by a NO-GB reach 356. Beyond that optical path distance however, a guard band on both sides of the transmitted signal may be utilized to address the cross-phase modulation interference component, and may extend the optical reach up to an all guard bands (ALL-GB) reach 366. The paths indicated by the histogram in this range of lengths may be referred to as number of ALL-GB paths 358. For path distances in range 362, exceeding ALL-GB reach 366, an optical signal may be terminated and regenerated to transmit over another optical path up to the maximum optical distance 354 in network 300. However, if the optical path length is between the ALL-GB reach 366 and the NO-GB reach 356, having a guard band along the entire path distance may not be necessary for the particular case of optical path distance.

For increased optical reach beyond maximum NO-GB reach 356, a mixture of full guard band along some paths and no guard bands along other paths depending on their particular respective length may be utilized. Such an approach may be referred to as the MIX-GB allocation method. The expected improvement in spectral utilization due to the MIX-GB allocation method compared to allocating guard band to all paths irrespective of path distance (referred to as the ALL-GB method) can be estimated by dividing the number of paths indicated by the histogram with path distances between NO-GB and ALL-GB reaches, by the total number of paths in the histogram. While having a mix of full guard bands and no guard bands may increase optical reach and spectral utilization, additional improvements in spectral utilization may be realized by using a variable guard band length along paths that do not require a full guard band.

Variable guard band (VAR-GB) paths 360 have a path length between NO-GB reach and ALL-GB reach. Curve 364 indicates a minimum required percentage of optical guard band for all optical reachability for VAR-GB paths. The improvement realized by varying the guard band along each path to allocate a minimum needed guard band to each path compared to ALL-GB allocation method can be estimated by computing the product of Guard Band Length percentage, frequency of occurrence of such length, and path length, divided by the product of the frequency of occurrence, path length and 100%. Such an approach may be referred to as the VAR-GB allocation method. Further, one option to reduce the use of guard bands, and thus reduce blocking, may be to reduce the width of the guard bands for optical paths that are less than the maximum optical reach, also referred to as the VAR-W-GB method. However, use of the VAR-W-GB method may result in a high-level of fragmentation of the spectrum due to variety of spectral widths. Thus, in some embodiments, a fixed width guard band is utilized in connection with variable guard band reach, also referred to as the VAR-L-GB method. Thus, the VAR-GB allocation method of the present disclosure may utilize fixed width guard bands, or more specifically, the VAR-L-GB method. For VAR-GB reach 360, the guard band is segmented along the optical path and only a certain percentage of the optical path distance is required to utilize the guard band. Further, the guard band may be utilized only on one side of the optical path. Thus, the VAR-L-GB method and VAR-GB allocation method may enable reallocation of the previous guard band spectrum to carry additional traffic. In addition, the location of the guard bands is variable to maximize the flexibility of adaptation to future traffic demands without the need for a prediction. Further, for a signal to reach the maximum optical reach 354, regenerators may be utilized. Regenerator reach 362 illustrates the optical reach realized by adding regenerators to the optical path.

FIGS. 4A-4C are examples of the optical reach of signals 404 and guard bands 406 across a spectrum. FIG. 4A illustrates a plot of signals 404-1 through 404-5 each with an optical reach that spans from node 402-1 to node 402-4. Each of signals 404-1 through 404-5 may not use guard bands to minimize or eliminate the accumulation of cross-phase modulation and other sources of noise because the accumulation may remain low enough to not prevent successful transmission of signals 404-1 through 404-5. As such, up to certain signal distances, guard bands may not be needed. However, the signal distance is limited. For example, the optical reach that spans from node 402-1 through 402-4 may be less than approximately 375 km. Thus, FIG. 4A illustrates NO-GB reach discussed with reference to FIG. 3B.

FIG. 4B illustrates a plot of signals 404-6 through 404-8 and guard bands 406-1 and 406-2. At certain distances, the accumulation of cross-phase modulation and other noise may necessitate the use of guard bands 406-1 and 406-2. Each of signals 404-6 through 404-8 may extend from node 402-1 thorough node 402-8 and may be separated by a guard band along the entire length. For example, signals 404-6 and 404-7 are separated by guard band 406-1 along the entire length of the signals. Signals 404-7 and 404-8 are separated by guard band 406-2 along the entire length of the signals. Based on the optical length of signals 404-6 through 404-8, a guard band along the entire length may minimize or eliminate cross-phase modulation or noise between the signals. Thus, FIG. 4B illustrates the ALL-GB allocation method in which a guard band extends the full optical reach of each signal, irrespective of signal distance.

FIG. 4C illustrates a plot of signals 404-9 through 404-14 and guard bands 406-3 through 406-5. In some embodiments, guard bands may not be included along the entire length of signals and may only be included as optimal to sufficiently minimize or eliminate cross-phase modulation. For example, signal 404-9 has an optical path length from node 402-1 to node 402-6 and requires a guard band for only a portion of the optical path length as shown by guard band 406-3. As such, signal 404-10 that extends from node 402-5 to 405-6 is placed adjacent to signal 404-9. As another example, signal 404-11, in addition to guard band 406-3, requires guard bands 406-4 and 406-5 that extend only for a portion of the optical path length between nodes 402-1 and 402-6. Signals 404-12 and 404-13 are placed adjacent to signal 404-11 as shown in FIG. 4C. FIG. 4C illustrates VAR-GB reach discussed with reference to FIG. 3B. Thus, the present disclosure contemplates determining optimal guard band length for a signal, and based on accommodation of the guard band, placing new signal demand as a neighboring signal to the existing signals across a spectrum. Each instance of a new signal being added, both the guard band requirements of existing signals are to be met as well as those of the new signal.

It is noted that generally 100% guard band distance corresponds to guard bands on both sides of the signal. If, for example, a guard band is allocated for 100% of the distance on one side of the signal only, this corresponds to 50% guard band distance. Alternatively, 50% guard band distance may be realized by guard band on both sides of the signal along 50% of the signal path distance.

Further, management of guard band in terms of a percentage of all-optical path length is only an example embodiment. Other measures could be used to manage guard bands, such as noise power density or number of spans rather than a distance. Additionally, the relation between required guard band as function of specific distance or route may be managed in more detail or with greater accuracy than can be expressed by a single curve. Impairments mitigated by guard bands may be expressed and managed as function of number of spans rather than distance because impairments may be dominant at the beginning of each span where signal powers may be strongest, diminishing in relevance as signal power decreases due to attenuation in the medium in each a span. However, this may not be the case in systems employing Raman amplification, for instance.

Figure 5:
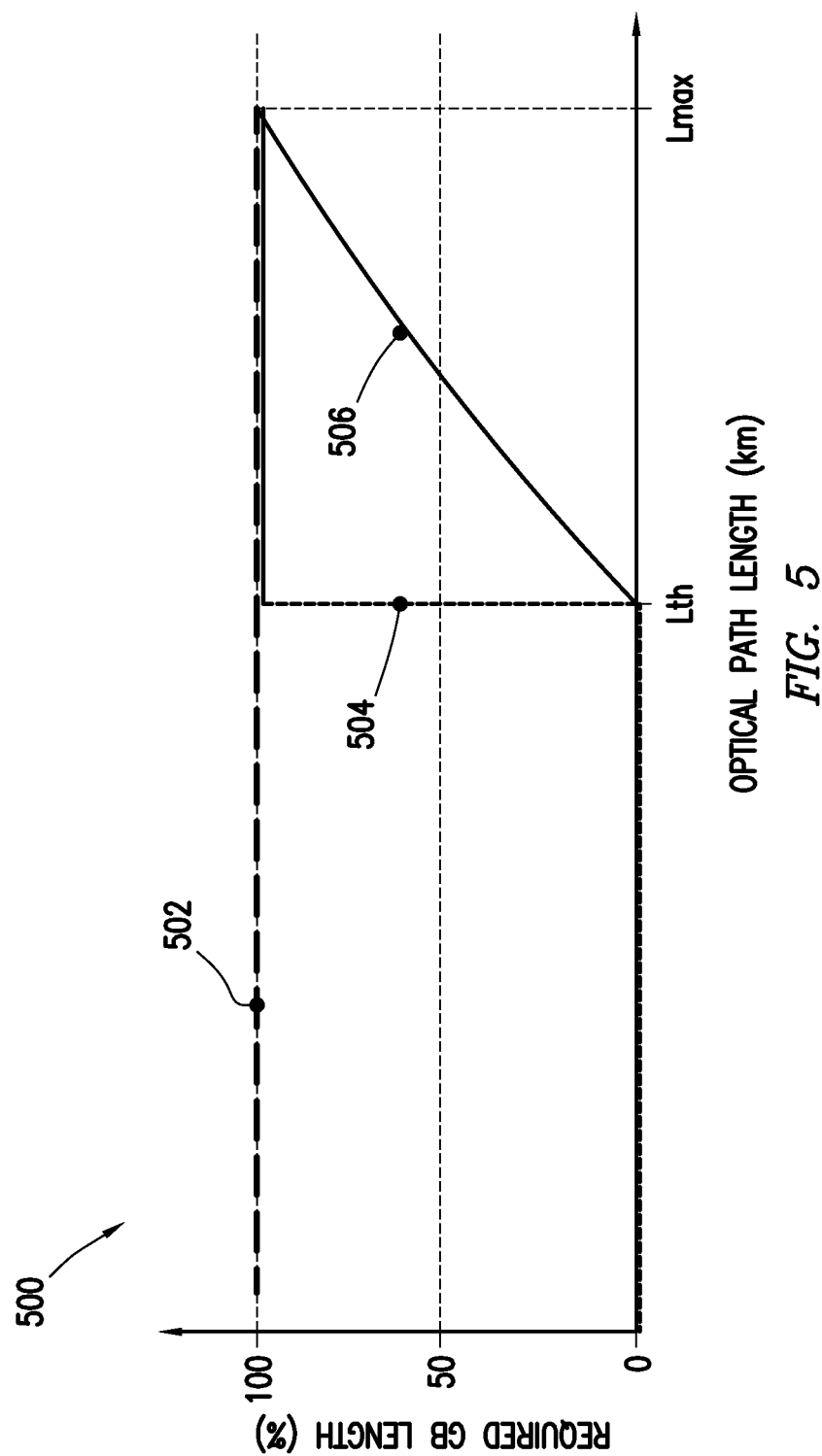
FIG. 5 is a graph illustrating the guard band length percentage as a function of optical path distance.

FIG. 5 is a graph 500 illustrating the guard band length percentage as a function of optical path distance. ALL-GB plot 502 indicates a one per-path guard band allocation using the ALL-GB allocation method that allocates a fixed width guard band along the entire path length to suppress cross-phase modulation irrespective of path distance. As example, for an optical path distance of approximately 600 km, which may be the optical reach limit (Lmax), a full length guard band (for example, 100% GB) may be needed (for example, 100% GB).

MIX-GB plot 504 indicates allocation of guard bands using the MIX-GB allocation method that allocates guard bands only for optical paths of lengths that exceed a certain threshold length (Lth). For shorter optical paths, cross-phase modulation may be accommodated within the optical budget and therefore, no guard band is needed. For example, for an optical path distance up to approximately 375 km, there may be no need for a guard band (for example, 0% GB). While for optical path distances greater than approximately 375 km, a full length guard band may be allocated.

VAR-GB plot 506 indicates allocation of partial guard bands using the VAR-GB allocation method. For example, at optical path distances between Lth and Lmax, a percentage of the optical path may have a guard band. Thus, with VAR-GB plot 506, multiple equivalent spatial allocations may be available and the amount of guard band may be varied based on length and not guard band spectral width.

In some embodiments, path computation element 202, discussed with reference to FIG. 2, performs a spectrum allocation using a first-fit method. To determine the fit of a new optical signal in a particular spectrum along a path, path computation element 202 determines each of the all-optical signals that may be co-propagating neighbor signals of the new optical signal. Based on the co-propagating neighbor signals, path computation element 202 determines the no guard band distance (NO-GB distance) that is still available. Path computation element 202 ensures that any guard band requirements of the new optical signal are met. If the NO-GB distance available satisfies the guard band requirements of the new optical signal, the new optical signal may be allocated the spectrum. The guard band requirement of the new optical signal may be determined in increments of 1% based on the actual optical path distance, and using the relation in FIG. 5.

Figure 6:
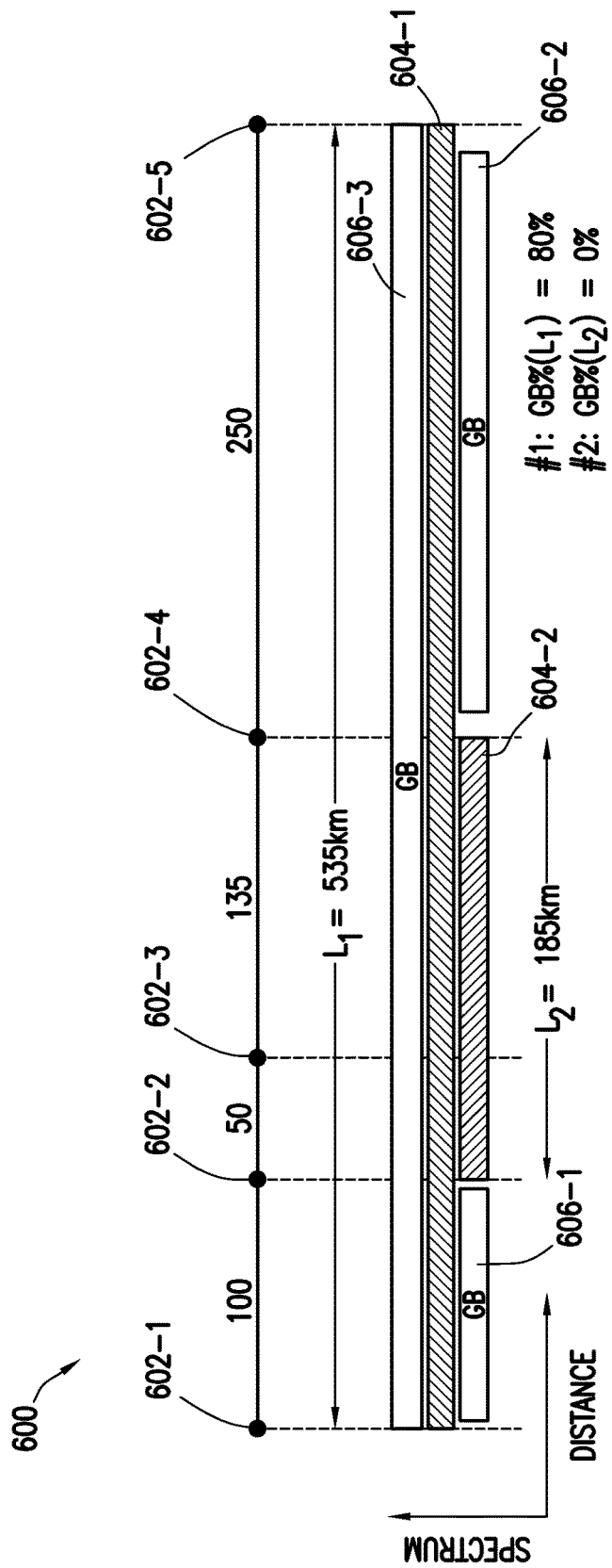
FIG. 6 is an example network 600 illustrating calculation and enforcement of guard band optimization using the VAR-GB allocation method during the search for a suitable spectrum for a new optical signal.

FIG. 6 is an example network 600 illustrating calculation and enforcement of guard band optimization using the VAR-GB allocation method during the search for a suitable spectrum for a new optical signal. Based on the optical signal characteristics in FIGS. 3A-5, first optical signal 604-1 may exist from node 602-1 to node 602-5 having a length $L_1$ of approximately 535 km, which requires a guard band for at least approximately 80% of the optical path, for example, 535 km×80%=428 km. Alternatively stated, 100%−80%=20% of the optical path does not need a guard band, for example, 535 km×20%=107 km on each side, or equivalent. Further, if the guard band is utilized on both sides of the signal, the 2×20%=40% or 2×107 km=214 km of the distance can be without a guard band on one side of the signal only. Thus, approximately 214 km may be the NO-GB distance for first optical signal 604-1. Therefore, a neighboring signal with an optical path distance of up to approximately 214 km can be placed next to the existing optical signal without a guard band. If a new demand, or new optical signal 604-2, arrives for a connection between node 602-2 and node 602-4, for example, with length $L_2$ of approximately 185 km path length, it can be accommodated next to first optical signal 604-1 without a guard band because its path length is less than the allowed no guard band length of approximately 214 km path along one side only. As shown in FIG. 6, the guard band distances may be quantized to the appropriate number of spans. For example, part of the guard band requirement for first optical signal 604-1 may be satisfied by allocating guard band 606-1 to the span between node 602-1 to node 602-2 and guard band 606-2 to the span between node 602-4 to node 602-5 on one side of first optical signal 604-1, and allocating guard band 606-3 to the span between node 602-1 and 602-5 on the other side of first optical signal 604-1.

The example of FIG. 6 illustrates that the VAR-GB allocation method may contribute to enhancement of network capacity via: 1) fine-granular tailoring of guard band spectrum along spans of individual paths; 2) flexible allocation of guard band on one side or both sides of a connection; and 3) delaying the actual reservation of the guard band spectrum in specific spans to be able to adapt to future traffic demands. For example, the location of guard band along the first connection may not be allocated until the new optical signal is added.

Figure 7:
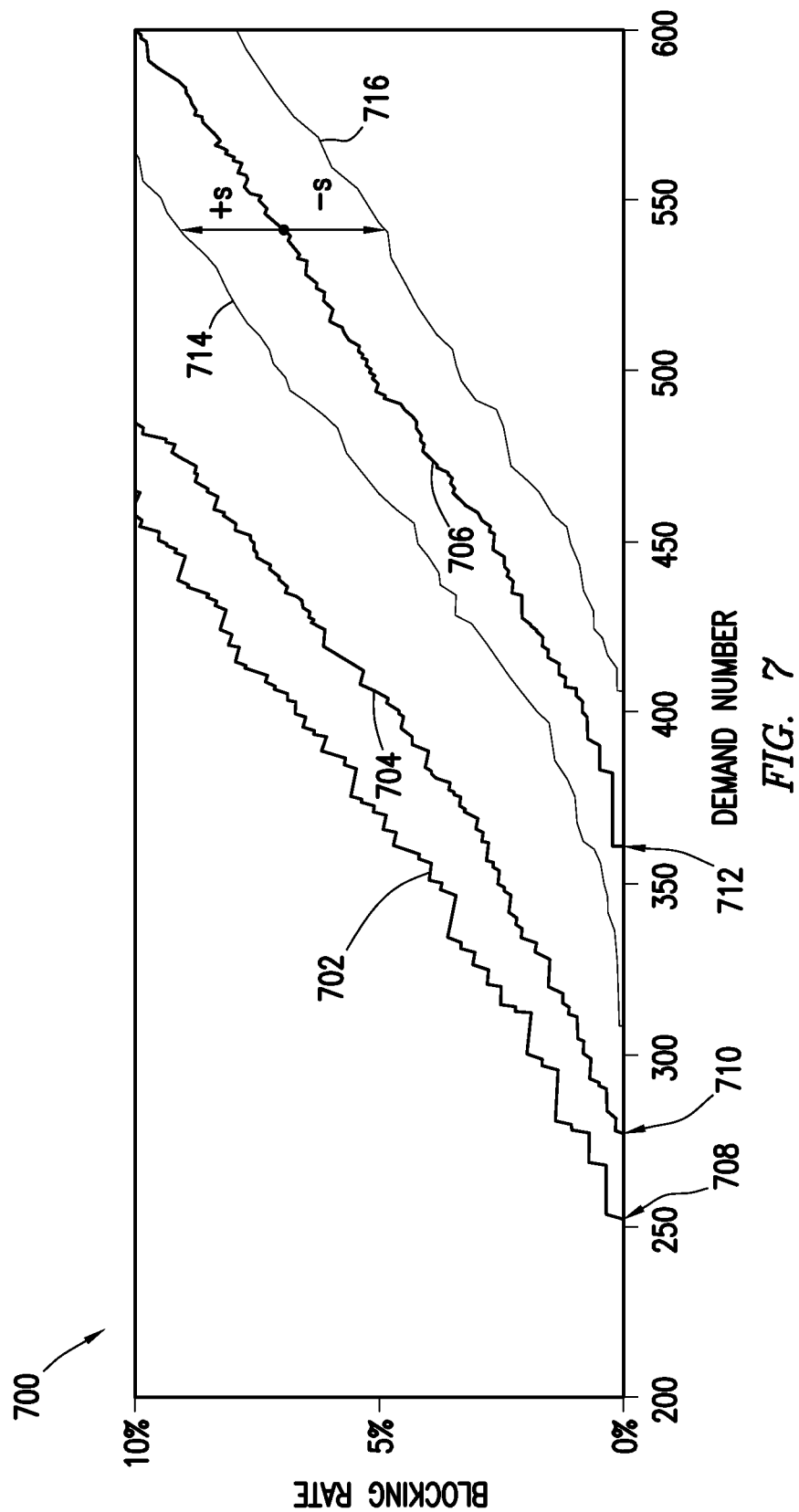
FIG. 7 is a graph of blocking rate as a function of demand number for different allocation methods.
Figure 8:
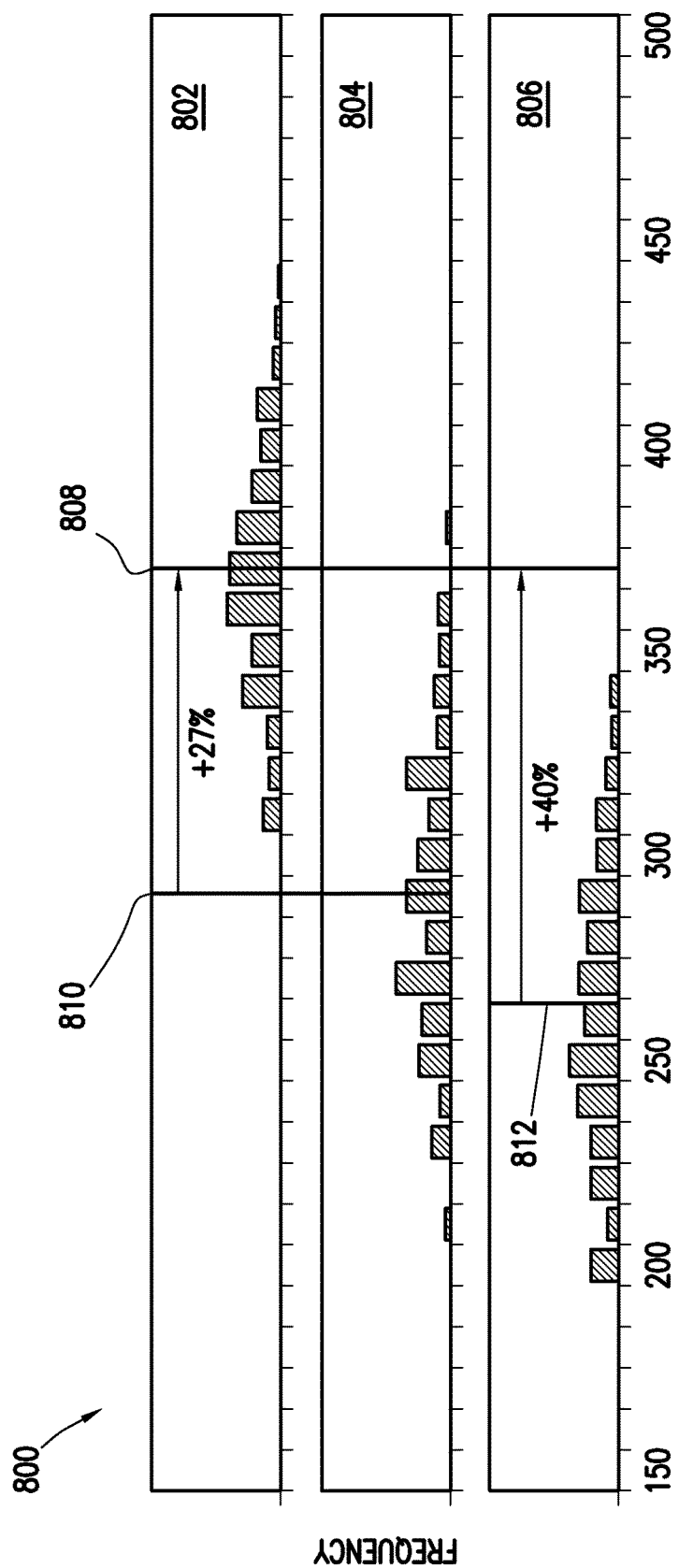
FIG. 8 is a series of histograms for the onset of first demand blocking for the different allocation methods.
Figure 9:
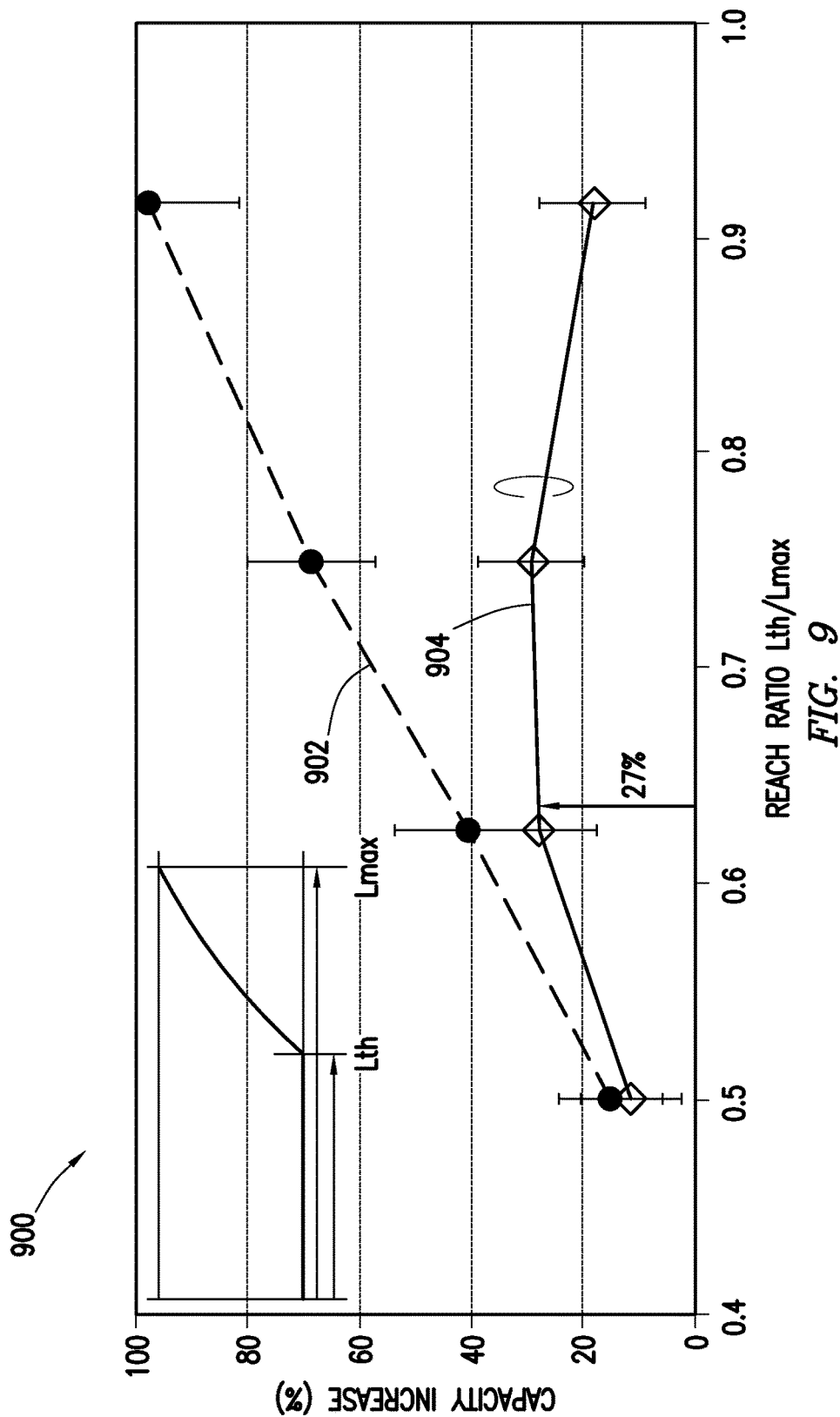
FIG. 9 is a graph of the capacity increase as a function of reach ratio for the different allocation methods.

FIGS. 7, 8, and 9 are results of simulations run for different allocation methods. To compare different allocation methods, pseudo-random sequences of subsequent traffic demands with different seeds were generated, and the demand that first blocks for each traffic pattern corresponding to the same seed were compared. The improvement is expressed as the median difference. The reference guard band method is the ALL-GB allocation method that includes full length guard bands for any path distance. The mixed guard band method is the MIX-GB allocation method that includes either none or full length guard bands depending on path distance. As such, the MIX-GB allocation method illustrates allocation of guard bands only if needed to reach required optical path distance. The VAR-GB allocation method illustrates allocation of guard bands of variable length based on the optical path distance and according to embodiments of the present disclosure.

For the purpose of evaluating the impact of the methods, a fast state-less path computation element and a network simulator were utilized. A method of the present disclosure was utilized to determine the amount of guard band to ensure optical reach of each path. The methods also determined, when a new signal is added in a certain range of spectral slices, if the guard band requirements can be maintained for all the existing signals in the network and for the added new signal. The signal spectrum width and the guard band width were selected to be equal in size, and the total optical width of the usable spectrum in each span was approximately 64 times the signal spectrum width. These parameters were not intended to match any specific modulation format, but merely to determine the general potential of the method of the current disclosure. Approximately 150 demand sequences were simulated to generate the data in FIGS. 7, 8, and 9.

FIG. 7 is a graph 700 of blocking rate as a function of demand number for different allocation methods. ALL-GB plot 702 indicates the blocking rate using the ALL-GB allocation method that includes a full length guard band for any path distance. ALL-GB demand 708 indicates the demand number at which blocking first occurred. MIX-GB plot 704 indicates the blocking rate using the MIX-GB allocation method that includes no guard band for paths less than a set distance (for example, approximately 375 km) a full length guard band for paths equal to or greater than the set distance. MIX-GB demand 710 indicates the demand number at which blocking first occurred. VAR-GB plot 706 indicates the blocking rate using the VAR-GB allocation method that includes no guard bands for paths less than a set distance and variable length guard bands for paths equal to or greater than the set distance. VAR-GB demand 712 indicates the point at which blocking first occurred in the VAR-GB allocation method. VAR-GB demand 712 is called the on-set of blocking for curve 706. Deviation plots 714 and 716 indicate one standard deviation bands for blocking rate relative related to median curve 706. As can be seen from graph 700, the VAR-GB allocation method was able to accommodate more optical signal demand before first blocking occurred than either the ALL-GB allocation method or the MIX-GB allocation methods. Thus, improvements in first demand blocking may be realized with use of the VAR-GB allocation method.

FIG. 8 is a series of histograms 800 for the onset of first demand blocking for the different allocation methods. VAR-GB histogram 802 indicates the frequency of first demand blocking for the VAR-GB allocation method, and VAR-GB median 808 indicates the median value for first demand blocking for the VAR-GB allocation method. MIX-GB histogram 804 indicates the frequency of the first demand blocking for the MIX-GB allocation method, and the MIX-GB median 810 indicates the median value for the first demand blocking for the MIX-GB allocation method. ALL-GB histogram 806 indicates the frequency of the first demand blocking for the ALL-GB allocation method and ALL-GB median 812 indicates the median value for the first demand blocking for the ALL-GB allocation method. As can be seen from histograms 800, the improvement in the median value for the first demand blocking between MIX-GB median 810 and VAR-GB median 808 is approximately 27%. Also, the improvement in the median value for the first demand blocking between ALL-GB median 812 and VAR-GB median 808 is approximately 40%.

FIG. 9 is a graph 900 of the capacity increase as a function of reach ratio for the different allocation methods. The reach ratio is a ratio of the reach without guard bands (Lth) and the maximum reach (Lmax). A smaller Lth, and associated reach ratio, may correspond to lower self-phase modulation, which may allow for higher accumulations of cross-phase modulation that can allow for narrower signal spacing. Plot 902 represents the improvement in capacity using the VAR-GB allocation method over the ALL-GB allocation method. Plot 904 represents the improvement in capacity using the VAR-GB allocation method over the MIX-GB allocation method. Less improvement in capacity is seen at lower reach ratios because a greater number of signals may need guard bands, which results in reduced probability to accommodate new signals without a guard band. At larger reach ratios, the VAR-GB allocation method becomes similar to the MIX-GB allocation method. Thus, the improvements shown in plot 904 decrease.

Based on some embodiments of the present disclosure, the results obtained in FIGS. 7, 8, and 9 corresponded to an increase of approximately 27% in capacity in the network using the VAR-GB allocation method over the MIX-GB allocation method, and approximately 40% increase in capacity in the network using the VAR-GB allocation method over the ALL-GB allocation method.

Further, the introduction of one additional 3R regenerator, which postpones the occurrence of first blocking, results in approximately 33% capacity improvement in the VAR-GB allocation method over the MIX-GB allocation method, and approximately 46% capacity improvement in the VAR-GB allocation method over the ALL-GB allocation method. The increase in network capacity between the MIX-GB allocation method and the ALL-GB allocation method is approximately 10% with and without one additional 3R regenerator introduced. The difference in improvement between the VAR-GB allocation method and the MIX-GB allocation method relative to the ALL-GB allocation method is due to the ability to work without guard bands on one side of a signal, and due to the ability to postpone allocation of the guard band spectrum until the traffic demands are known.

Moreover, the fact that first blocking is due to local bottle-necks, even small improvements in that bottle-neck can make a significant difference in postponing first blocking. The present disclosure illustrates a solution for minimizing blocking by employing a span-wise spectrum management system that utilizes a new spectral slice and allocation method. The present disclosure demonstrates how span-wise management of the optical spectrum can have a large impact on increasing optical network capacity. The level of improvement depends on optical signal transmission signal design, optical budgeting, and on the characteristics of the optical network. Since regenerated connections involve all-optical paths close to maximum optical reach, the impact is reduced, but in metro-regional networks the method can improve the capacity of the network by approximately 27% without allowing any additional regenerators beyond the minimum for the shortest path, or 33% if first blocking can be delayed by allowing alternate routes with up to one additional regenerator.

Figure 10:
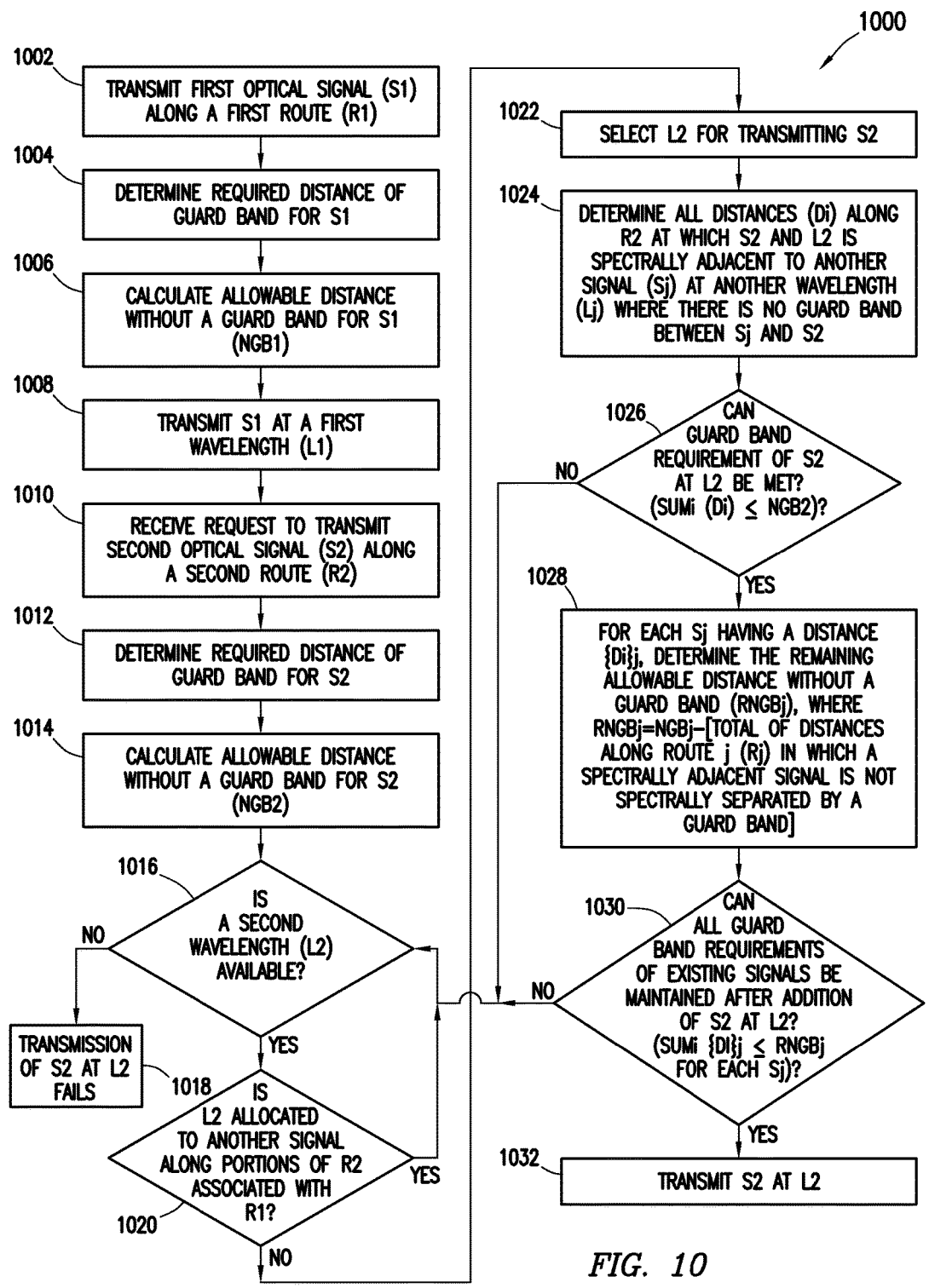
FIG. 10 is a flowchart of selected elements of an embodiment of method for span-wise management of the optical spectrum.

FIG. 10 is a flowchart of selected elements of an embodiment of method 1000 for span-wise management of the optical spectrum. Method 1000 may be performed using components of control system 200, such as path computation engine 202, discussed with reference to FIG. 2. At least certain portions of method 1000 may be performed by a processor having access to memory media storing instructions executable by the processor, for example, such as processor 208. It is noted that certain operations described in method 1000 may be optional or may be rearranged in some embodiments.

At step 1002, a control system transmits a first optical signal (S1) along a first route (R1). For example, control system 200 may transmit first optical signal 604-1 along a route from node 602-1 to node 602-5 having a length $L_1$ of approximately 535 km, as discussed with reference to FIG. 6.

At step 1004, the control system determines the optical path distance that requires a guard band for S1 based on minimizing or reducing accumulation of cross-phase modulation. For example, control system 200 may determine that first optical signal 604-1 requires a guard band at least approximately 80% of the optical path, for example, 535 km×80%=428 km.

At step 1006, the control system calculates the allowable optical path distance without a guard band (NGB1) for S1. The NGB1 distance may be calculated based on application of a variable, such as a factor, difference, or percentage, to the optical path distance. For example, control system 200 may determine that first optical signal 604-1 does not need a guard band for 535 km×20%=107 km on each side, or equivalent. Alternatively stated, 100%−80%=20% of the optical path can be without a guard band. Further, if the guard band is utilized on both sides of the signal, the 2×20%=40% or 2×107 km=214 km of the distance can be without a guard band on one side of the signal only and thus, approximately 214 km may be the NGB1 distance. Therefore, a neighboring signal with an optical path distance of up to approximately 214 km can be placed next to first optical signal 604-1 without a guard band. At step 1008, the control system transmits S1 at a first wavelength (L1).

At step 1010, the control system receives a request to transmit a second optical signal (S2) along a second route (R2). For example, control system 200 may receive a request to transmit new optical signal 604-2 along a route from node 602-2 and node 602-4, for example, with length $L_2$ of approximately 185 km.

At step 1012, the control system determines the optical path distance that requires a guard band for S2. For example, control system 200 may perform operations similar to that described in step 1004 for S2.

At step 1014, the control system calculates the allowable optical path distance without a guard band (NGB1) for S2. For example, control system 200 may perform operations similar to that described in step 1006 for S2.

At step 1016, the control system determines if a second wavelength (L2) is available. For example, the control system may determine if L2 is available spectrally adjacent or neighboring L1. If there is no neighboring wavelength available, the control system may determine if any other L2 is available beginning proximate to L1 and progressively moving further away. If L2 is not available, then method 1000 proceeds to step 1018 and the transmission of S2 at L2 fails. If L2 is available, method 1000 proceeds to step 1020.

At step 1020, the control system determines if the selected L2 is allocated to another signal along the portions of R2 associated and/or intersecting with R1. If L2 is allocated to another signal along the portions of R2 associated with R1, method 1000 return to step 1016. If L2 is not allocated to another signal along the portions of R2 associated with R1, method 1000 proceeds to step 1022 where the control system tentatively selects L2 for transmitting S2.

At step 1024, the control system determines all distances (Di) along R2 at which S2 at L2 is spectrally adjacent to or neighboring another signal (Sj) at another wavelength (Lj) and where there is no guard band between S2 and Sj. For example, control system 200 may determine, based on L2, distances (Di) without a guard band between new optical signal 604-2 and any neighboring optical signals.

At step 1026, the control system determines if the guard band requirement of S2 at L2 can be met. For example, the control system determines if the sum of all Di is less than or equal to NGB2. If the sum of all Di is greater than NGB2, then method 1000 returns to step 1016. If the sum of all Di is less than or equal to NGB2, then method 1000 proceeds to step 1028.

At step 1028, the control system, for each Sj having a distance {Di}j, determines the remaining allowable distance without a guard band (RNGBj). RNGBj is equal to NGBj minus the total of distances along a route j (Rj) in which a spectrally adjacent or neighboring signal is not spectrally separated by a guard band. At step 1030, the control system determines if all guard band requirements of existing signals can be maintained after addition of S2 at L2. For example, the control system determines if the sum of all {Di}j is less than or equal to RNGBj for each Sj. If the sum of all {Di}j is greater than RNGBj for each Sj, then method 1000 returns to step 1016. If the sum of the sum of all {Di}j is less than or equal to RNGBj for each Sj, then method 1000 proceeds to step 1032 and the control system transmits S2 at L2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for optical signal transmission comprising:
   transmitting a first optical signal at a first wavelength by a control system, the first optical signal having a first optical path distance;
   calculating a length of the first optical path distance that may be traversed by the first optical signal without a guard band;
   determining a first guard band requirement for the first optical signal by applying a percentage to the first optical path distance, the percentage based on the first optical path distance that may be traversed without a guard band, and the first guard band requirement is further based on a length of a portion of the first optical path that is greater than a threshold length;
   transmitting a second optical signal by the control system, the second optical signal having a second optical path distance;
   determining a second guard band requirement for the second optical signal; and
   placing the second optical signal spectrally adjacent to the first optical signal by selecting a second wavelength, the second wavelength selected to satisfy the first and second guard band requirements.

2. The method of claim 1, wherein the first guard band requirement is satisfied by allocating a plurality of first guard bands in a plurality of optical spans.

3. The method of claim 2, wherein the plurality of first guard bands include a particular guard band with a different length than another guard band.

4. The method of claim 2, wherein the plurality of first guard bands include a particular guard band with a different width than another guard band.

5. The method of claim 2, wherein the plurality of first guard bands include a first fixed-width guard band and a second fixed-width guard band.

6. The method of claim 1, wherein placing the second optical signal includes placing the second optical signal in a plurality of optical spans.

7. The method of claim 1, wherein calculating the length of the first optical path distance that may be traversed by the first optical signal without a guard band is based on including two sides of the first optical signal.

8. The method of claim 1, wherein the percentage is applied in increments of one percent.

9. The method of claim 1, wherein applying the percentage is based on a first-fit method.

10. The method of claim 1, further comprising placing a first guard band based on the first guard band requirement.

11. The method of claim 10, further comprising placing a second guard band based on the second guard band requirement.

12. A network element comprising:
   a processor configured to:
      receive a first optical signal at a first wavelength, the first optical signal having a first optical path distance;
      calculate a length of the first optical path distance that may be traversed by the first optical signal without a guard band;
      determine a first guard band requirement for the first optical signal by applying a percentage to the first optical path distance, the percentage based on the first optical path distance that may be traversed without a guard band, and the first guard band requirement is further based on a length of a portion of the first optical path that is greater than a threshold length;
      receive a second optical signal having a second optical path distance;
      determine a second guard band requirement for the second optical signal; and
      place the second optical signal spectrally adjacent to the first optical signal by selecting a second wavelength, the second wavelength selected to satisfy the first and second guard band requirements.

13. The network element of claim 12, wherein the first guard band requirement is satisfied by allocating a plurality of first guard bands in a plurality of optical spans.

14. The network element of claim 13, wherein the plurality of first guard bands include a particular guard band with a different length than another guard band.

15. The network element of claim 13, wherein the plurality of first guard bands include a particular guard band with a different width than another guard band.

16. The network element of claim 13, wherein the plurality of first guard bands include a first fixed-width guard band and a second fixed-width guard band.

17. The network element of claim 12, wherein placing the second optical signal includes placing the second optical signal in a plurality of optical spans.

* * * * *